United States Patent [19]

Schmitz

[11] Patent Number: 4,623,828
[45] Date of Patent: Nov. 18, 1986

[54] MULTIPLE PHASE STEPPER MOTOR TORQUE CONTROL APPARATUS AND METHOD

[75] Inventor: William E. Schmitz, Pittsburgh, Pa.
[73] Assignee: Westinghouse Electric Corp., Pittsburgh, Pa.
[21] Appl. No.: 779,306
[22] Filed: Sep. 23, 1985

Related U.S. Application Data

[63] Continuation of Ser. No. 590,108, Mar. 19, 1984.

[51] Int. Cl.$^4$ ............................................. H02P 8/00
[52] U.S. Cl. .................................... 318/696; 318/685
[58] Field of Search ............... 318/685, 696; 368/157, 368/85–87, 217–219

[56] References Cited

U.S. PATENT DOCUMENTS 4,361,410 11/1982 Nakajima et al. .................. 368/157

OTHER PUBLICATIONS

"Stepping Moters and Their Microprocessor Controls", Kenjo, Clarendon Press Oxford, 1984.

Primary Examiner—William M. Shoop, Jr.
Assistant Examiner—Saul M. Bergmann
Attorney, Agent, or Firm—R. S. Lombard

[57] ABSTRACT

A control apparatus and method are disclosed for controlling the output torque of a multiple phase stepper motor, by turning OFF the normally excited phases for predetermined periods.

7 Claims, 14 Drawing Figures

MULTIPLE PHASE STEPPER MOTOR TORQUE CONTROL APPARATUS AND METHOD

This application is a continuation of application Ser. No. 590,108 filed Mar. 19, 1984.

CROSS REFERENCE TO RELATED APPLICATIONS

The present application is related to a patent application Ser. No. 500,217 filed 06-02-83 by W. E. Schmitz and entilted Propulsion Control Apparatus For Passenger Vehicles and is related to a patent application Ser. No. 590,109 filed concurrently herewith by W. E. Schmitz and entitled STEPPER MOTOR DOOR CONTROL APPARATUS AND METHOD, which are assigned to the same assignee and the disclosures of which are incorporated herein by reference.

BACKGROUND OF THE INVENTION

A multiple phase stepper motor is a rotary motion apparatus having a plurality of windings or phases which provides desired incremental movement of a load in response to sequential input control pulses and will provide the desired movement of that load coupled with the motor in response to the control pulses until the required load torque exceeds the electromagnetic capability of the motor. When this pull-out condition occurs the motor will miss desired step movements, and the torque at which the step movements are missed is a function of the motor speed in relation to steps per second, the basic motor design and the electric drive circuit controlling the stepper motor.

Typical multiple phase stepper motors are presently available in the open market such as, made and sold by Superior Electric Company of Bristol, Conn. Model M112FJ12. A control apparatus, for such a motor is generally used and often includes a programmed microprocessor, operative to sequentially energize the stepper motor stator coils with the required input control pulses to obtain a given angular speed, including accelerating and decelerating below the torque limits of the stepper motor, is well known in the prior art.

It is known in the prior art to provide a motor for opening and closing the passenger doors on a transit vehicle in response to door command signals from a vehicle automatic train operation control apparatus, as described in an article entitled Recent Applications of Microprocessor Technology to People Mover Systems by M. P. McDonald et al. and published in the conference proceedings for the 29th IEEE Vehicle Technology Group Conference held in Chicago, Ill. during March, 1979.

SUMMARY OF THE INVENTION

A stepper motor door control apparatus with variable torque control and method are provided for modifying the torque level of a multiple stepper motor at which the pull-out of step condition, in response to an applied control pulse, or missed rotational steps occurs. This modification can be accomplished such that the stepper motor slip torque can be controlled as desired thus giving the control apparatus variable torque control.

BRIEF DESCRIPTION OF THE DRAWINGS

FIG. 10 shows the output torque of a stepper motor in relation to the step rate of the motor and the percentage of prior art excitation time the excited phases of the present invention are ON;

FIG. 11 shows the motor current of a stepper motor in relation to the step rate and the percentage of prior art excitation time of the excited phases of the present invention are ON;

DESCRIPTION OF A PREFERRED EMBODIMENT

Figure 1:
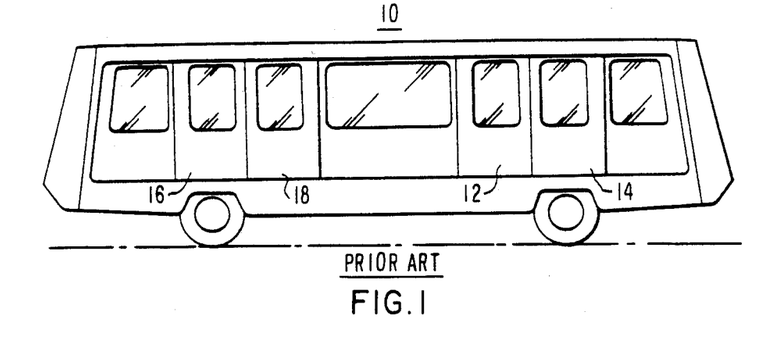
FIG. 1 shows a side view of a prior art transit vehicle including passenger doors in a closed position.

In FIG. 1 there is shown a prior art transit vehicle 10 including a first pair of closed passenger doors 12 and 14 and a second pair of closed passenger doors 16 and 18.

Figure 2:
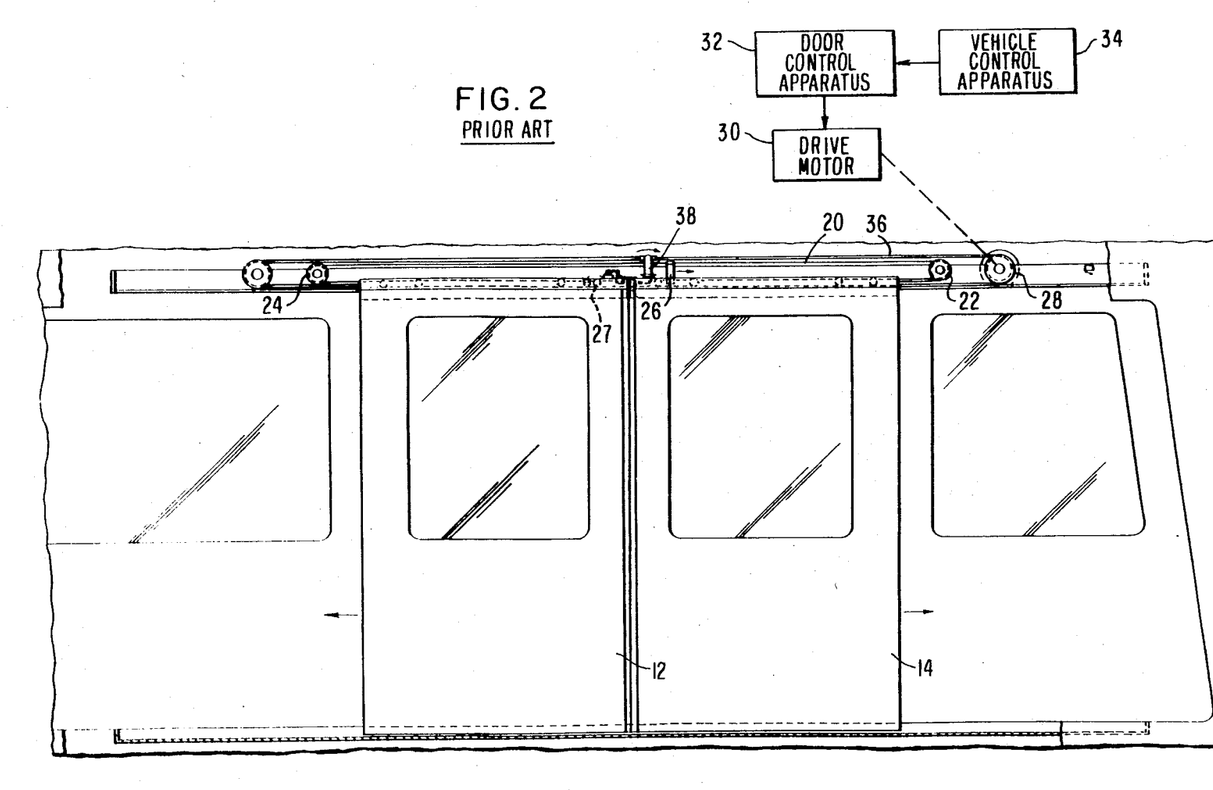
FIG. 2 shows a prior art direct or alternating current motor coupled to operate a pair of biparting passenger doors of a transit vehicle.

In FIG. 2 there are shown the prior art passenger doors 12 and 14 of a vehicle and operative with a connecting drive cable 20 that is looped around an idler pulley 22 and a similar idler pulley 24 and connected through fasteners 26 to move the passenger door 14 and is connected to passenger door 12 through fastener 27 to move the passenger door 12 such that in this way the passenger doors 12 and 14 can be opened or can be closed together, as described in U.S. Pat. No. 4,142,326 of W. E. Schmitz. A drive pulley 28 is coupled with a direct or alternating current drive motor 30 and operated by a suitable door control apparatus 32 in response to door open and door closed input control signals from a well known vehicle control apparatus 34. A drive belt member 36 is connected through the drive arm 38 for applying a door movement and door unlatching force to the passenger door 14. The drive belt 36 provides a linear translation force to move the door 14 through its desired travel to the right for the purpose of separating or opening the passenger doors 12 and 14. The same force that moves the door 14 open and closed also unlocks and locks the lock mechanism coupled with the drive arm 38. When the motor 30 is not energized and the passenger doors 12 and 14 are closed, the doors 12 and 14 cannot be opened by applying an opening force directly to either door 12 or 14. However, when the door opening force is applied by the drive member 38 to the lock mechanism, the latter will unlock and the door 14 will move to the right while the door 12 will move to the left in conjunction with the movement of the door 14.

Figure 3:
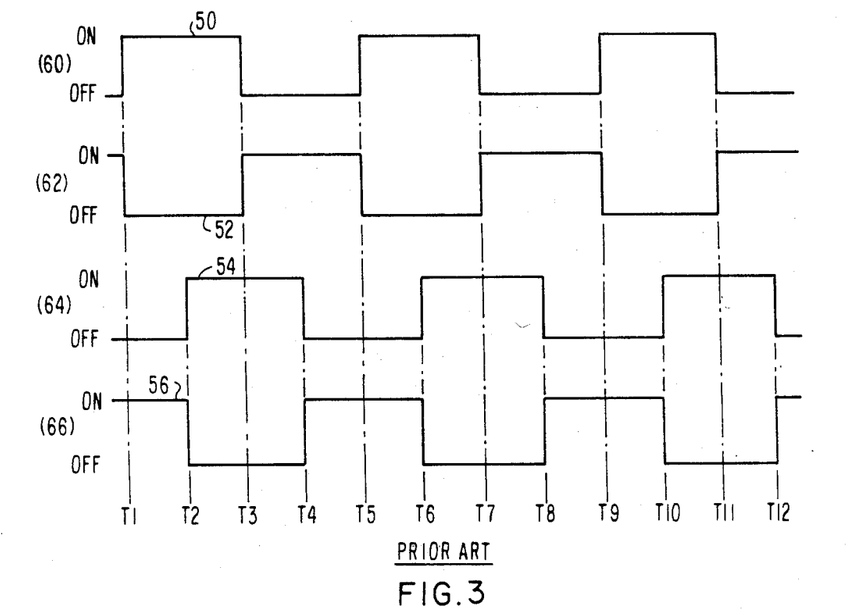
FIG. 3 shows a prior art stepping motor stator coil two phase-on energization sequence provided for a typical four-phase stepper motor.

In FIG. 3 there is shown a prior art coil two-phase on excitation sequence for a well known four-phase stepper motor. The respective stator coil currents in general follow the illustrated waveforms shown in FIG. 3. Each state change of the excitation causes the rotor to incrementally rotate a fixed angle, which is dependent on the motor construction, and typically can be 1.8°, 3.6°, 7.5° or 15°. The current wave 50 is ON at time T1 and then goes OFF at time T3 and then goes back ON at time T5 and goes OFF at time T7. The current wave 52 goes OFF at time T1, then goes ON at time T3 and then goes OFF at time T5 and goes ON at time T7. The current wave 54 goes ON at time T2 and goes OFF at time T4 goes ON at time T6 and goes OFF at time T8. The current wave 56 goes OFF at time T2, goes ON at time T4, goes OFF at time T6 and goes ON at time T8. In the prior art excitation sequence as can be seen in FIG. 3, for a multiple phase stepper motor, two phases are normally excited at all times.

Figure 4:
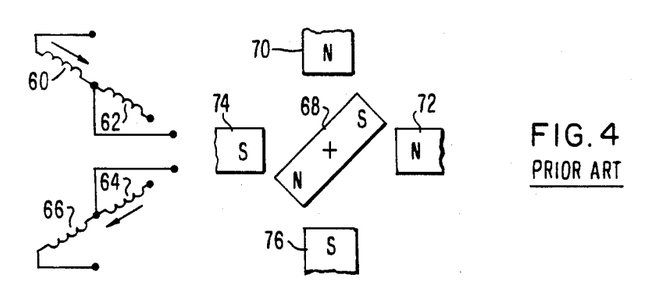
FIGS. 4 through 7 illustrate the successive sequential rotational movement positions of a prior art two phase-on four-phase stepping motor.
Figure 5:
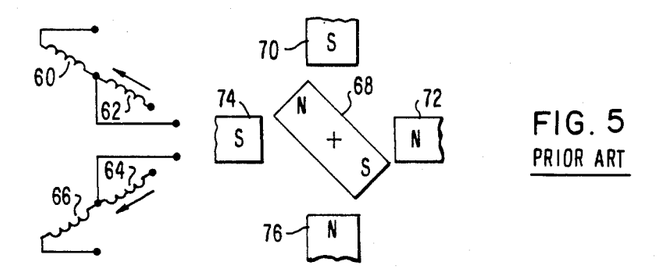
Figure 6:
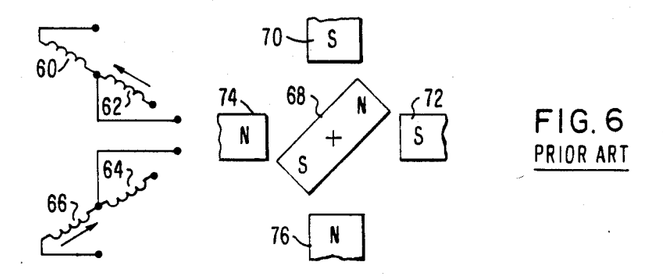
Figure 7:
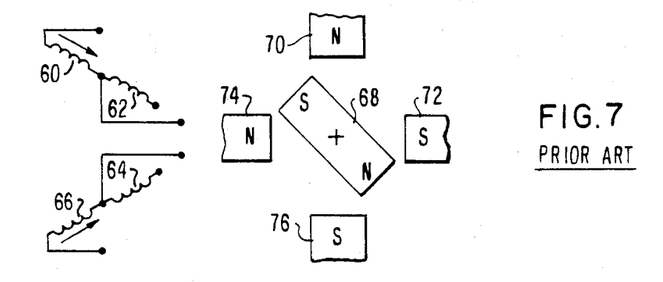

In FIGS. 4, 5, 6 and 7 there is shown an illustrative sequential rotational movement of a simplified rotor of a prior art two phase-on four-phase stepping motor. When the field coils 60 and 64 as shown in FIG. 4 are energized at time T2 as shown by the arrows and corresponding to the current wave 50 energizing the field coil 60 and the current wave 54 energizing the field coil 64, the permanent magnet rotor 68 is aligned with the south rotor pole between the two north field poles 70 and 72 and the north rotor pole between the two south field poles 74 and 76. When the field coils 62 and 64 are energized at time T3 as shown by the arrows in FIG. 5, the rotor 68 aligns itself as illustrated with the south rotor pole between the two north field poles 72 and 76 and the north rotor pole between the two south field poles 70 and 74. When the field coils 62 and 66 are energized at time T4 as shown by the arrows in FIG. 6, the rotor 68 moves to the position with the south and north rotor poles as illustrated. When the field coils 60 and 66 are energized at time T5 as shown by the arrows in FIG. 7, the rotor 68 is positioned with the south and north rotor poles as illustrated. When the rotor 68 is again positioned as shown in FIG. 4 the rotor 68 will have rotated through a total of 360°. It should be understood that an actual stepping motor rotor would require 200, 100, 48, 24 of the like steps to make one 360° rotation.

Figure 8:
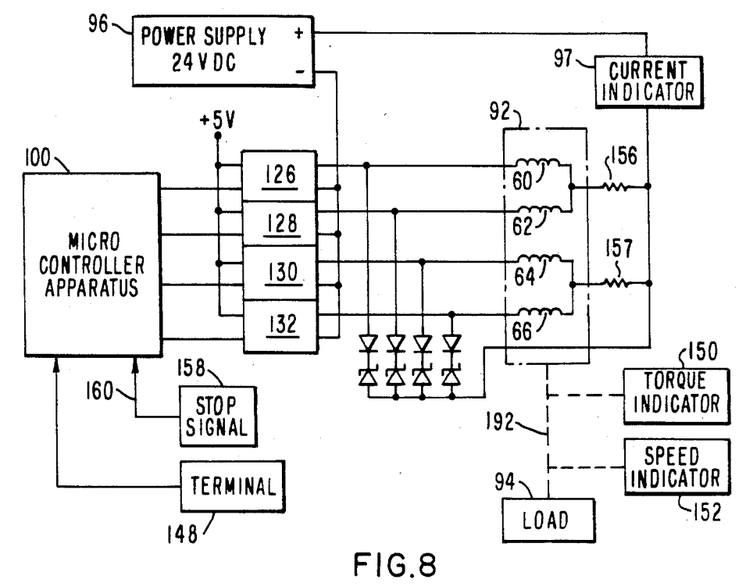
FIG. 8 shows an illustrative embodiment of the present invention, including a microprocessor controller apparatus coupled with a stepper motor for moving a load and provided for establishing the stepper motor torque when moving that load.

In FIG. 8 there is shown a microcontroller 100 coupled through the drivers 126, 128, 130 and 132 to energize the respective stator coils 60, 62, 64 and 66 of a stepping motor 92. The shaft 142 of the motor 92 is coupled with a load 94, which could be the drive pulley 28 of the door control apparatus shown in FIG. 2. A program terminal 148 is operative to provide and modify the control programs supplied to the microcontroller 100. A torque indicator 150 is coupled with the motor shaft 142 for indicating the motor torque. A speed indicator 152 is coupled with the motor shaft 142 for indicating the motor speed A stop signal device 158 provides a stop control signal 160 to the microcontroller 100. A power supply 96 is connected through a resistor 156 to the field coils 60 and 62, and is connected through a resistor 157 to the field coils 64 and 66.

Figure 9:
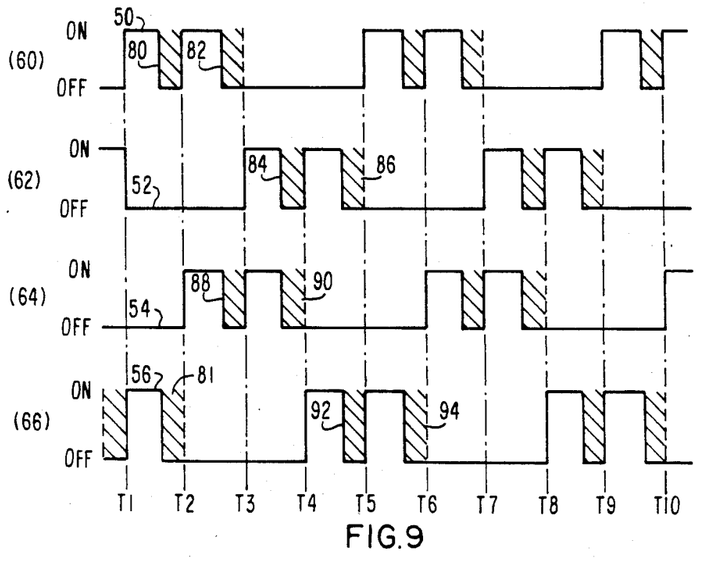
FIG. 9 illustrates the stepper motor torque control operation of the present invention.

FIG. 9 illustrates the stepper motor torque control operation of the present invention, and shows the general coil excitation sequence, for the two phase-on four-phase stepper motor corresponding to that shown in FIG. 3. For providing torque control, the multiple phase stepping motor utilizing the prior art excitation sequence of maintaining two phases being driven at all times as shown in FIG. 3 for a two phase-on four-phase stepping motor for example is changed by the present invention so that the two phases that are normally excited under the prior art excitation sequence are maintained in a simultaneous off condition for predetermined periods of the excitation sequence, thus permitting control of the torque of the motor. This technique is also applicable to a multiple phase single phase-on excitation sequence of the prior art. These simultaneous OFF periods 80 and 81 for example control the average current through the stator coils 60 and 66 between the times T1 and T2 for example and it is the magnetic strength of the stator coils 60 as determined by the average coil current in conjunction with the magnetic strength of the stator coil 66 that determines the torque at which the rotor 68 misses step movements. As can be seen, in FIG. 9 during simultaneous OFF periods. 80 and 81, 82 and 88, 84 and 90, 86 and 92, no excitation is provided to the motor. The time of these OFF periods determines the pull-out torque of the motor.

To obtain torque versus speed curves for the motor 92, the operating speed of the stepping motor 92 which is the stepping rate was determined by the microcontroller 100 including an application software program using a selectable time delay between changes of the stepping states. The motor 140 was run at a plurality of predetermined stepping rates and the load 94 was adjusted by using a variable friction device for the load such as shown in FIG. 14 to require a plurality of torque values, with the highest torque value sustained being noted before the slipping of the requested motor step operations occurred.

Figure 14:
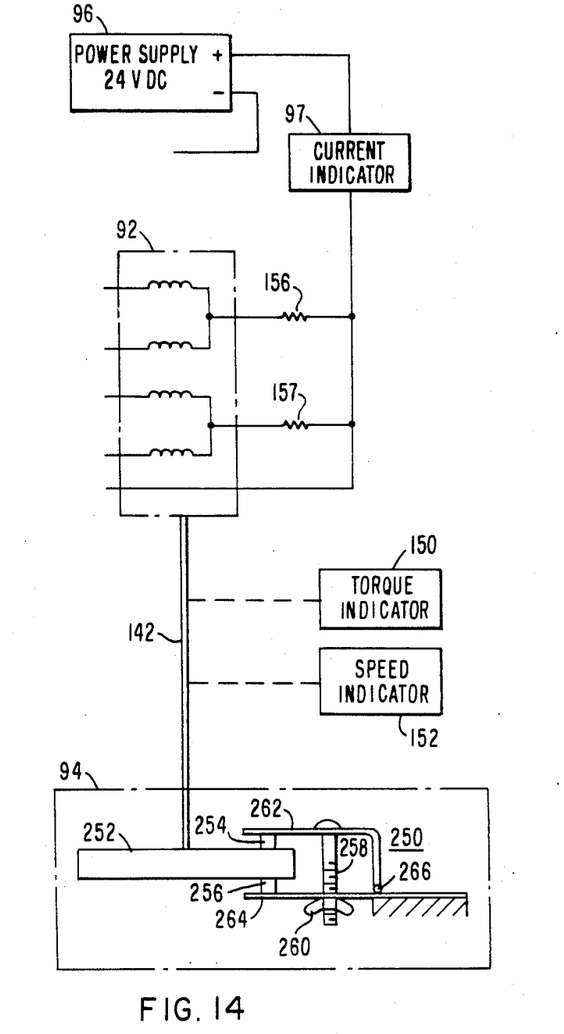
FIG. 14 shows a variable friction device used for the load coupled with the stepper motor.

As shown in FIG. 14, the load 94 coupled with the motor 92 can include a variable friction device 250 including a disc member 252 coupled with the motor shaft 142 and friction pads 254 and 256 that are applied to the disc member 252 with an adjustable force determined by the threaded bolt and adjustable nut 260 operative between frame members 262 and 264 including a pivot connection 266.

The following table shows the results of the operation of the stepping motor 92 at stepping rates of 75 steps per second, 100 steps per second, 150 steps per second, 200 steps per second and 250 steps per second. The table also shows the provided percentage of the prior art excitation time of the normal energization of the respective motor stator coils to be 100%, 85%, 70% and 55%. The corresponding motor current in amperes is shown in relation to each of the stepping rates and percentage of prior art excitation time, and the corresponding slip torque in inch pounds is shown for each of the stepping rates.

TABLE 1

| Program Total Delay | Input On Delay | Motor Step Rate Step/Sec | Percent On | Motor Current Amps | Slip Torque In # |
|---|---|---|---|---|---|
| 238 | 238 | 75 | 100 | 27 | 75 |
|  | 202 |  | 85 | 22 | 64 |
|  | 167 |  | 70 | 18 | 53 |
|  | 131 |  | 55 | 13 | 38 |
| 177 | 177 | 100 | 100 | 25 | 68 |
|  | 150 |  | 85 | 20 | 55 |
|  | 124 |  | 70 | 16 | 43 |
|  | 97 |  | 55 | 12 | 37 |
| 117 | 117 | 150 | 100 | 21 | 67 |
|  | 100 |  | 85 | 17 | 60 |

TABLE 1-continued

| Program Total Delay | Input On Delay | Motor Step Rate Step/Sec | Percent On | Motor Current Amps | Slip Torque In # |
|---|---|---|---|---|---|
|  | 82 |  | 70 | 13 | 36 |
|  | 64 |  | 55 | 9.5 | 23 |
| 88 | 88 | 200 | 100 | 17 | 63 |
|  | 75 |  | 85 | 14 | 54 |
|  | 62 |  | 70 | 10.5 | 39 |
|  | 48 |  | 55 | 8 | 21 |
| 70 | 70 | 250 | 100 | 13 | 54 |
|  | 60 |  | 85 | 12 | 42 |
|  | 49 |  | 70 | 9 | 23 |
|  | 38 |  | 55 | 6 | 17 |

The number in the first column of the above table was set in a first counter and then decremented by the clock of the microcontroller 100 to establish the time delay of the prior art excitation time and OFF time periods of the present invention as shown in FIG. 9 to determine the step rate of the motor 92. The number of the second column was set in a second counter and decremented to determine the percent of prior art excitation time. The variable friction device 250 was then used by the operator to determine the highest motor torque value as shown by torque indicator 150 at which slipping of the requested motor step operations occurred, and this established the slip torque in column six and the corresponding motor current in column five as shown by the current indicator 97.

Figure 10:
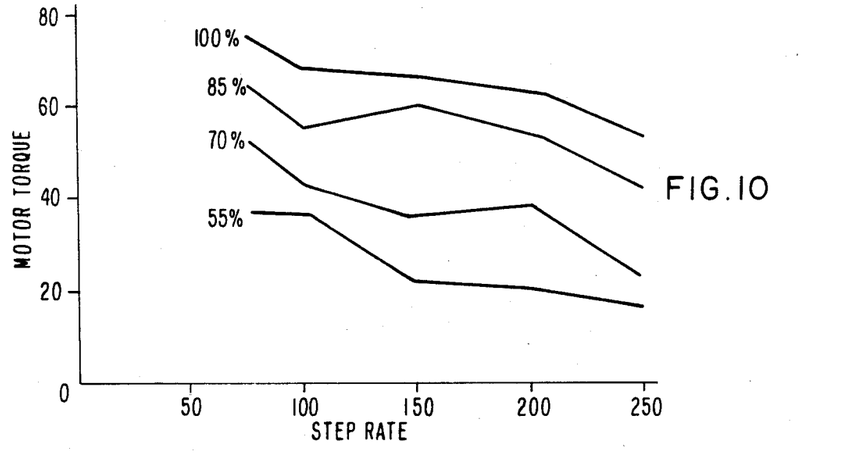

In FIG. 10 the torque in inch pounds as shown in the above table is plotted for each of the motor steps per second and for each of the percentage prior art excitation times.

Figure 11:
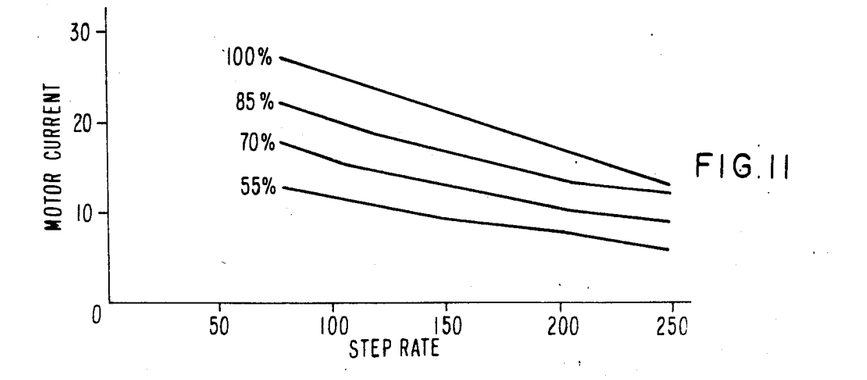

In FIG. 11 the motor current in amperes as shown in the above table is plotted for each of the motor steps per second and in relation to each of the percent on times.

Figure 12:
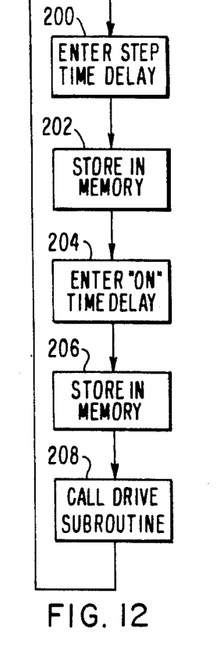
FIG. 12 shows a flow chart to illustrate a data entering program for the stepping motor control apparatus in accordance with the present invention.

In FIG. 12 there is shown a flow chart for the control program which establishes the desired step excitation time delay or the step rate, and the percentage of prior art excitation time for each energization of the stator fields entered by the operator from the terminal 148 shown in FIG. 18. Within the limits of the time delay subroutines, this allows the stepper motor 92 to be run at any desired speed and with any reasonable desired percent of prior art excitation time. At block 200 the desired step time delay period is entered. At block 202 the step time delay is stored in memory. At block 204 the percentage of prior art excitation time delay is entered, and at block 206 the percentage prior art excitation time delay is stored in memory. At block 208 the drive subroutine shown in FIG. 13 is called.

Figure 13:
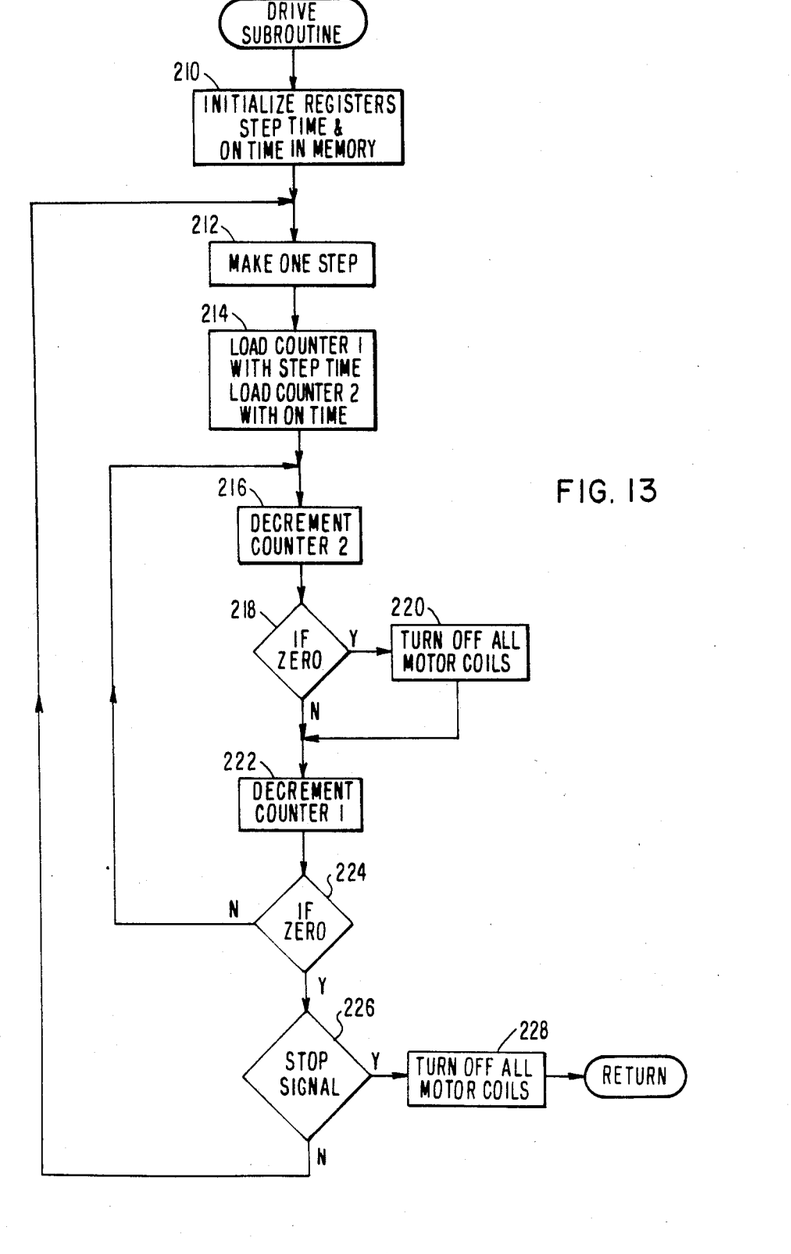
FIG. 13 shows a flow chart to illustrate a control program for the stepping motor control apparatus in accordance with the present invention.

In FIG. 13 a flow chart for the drive subroutine is shown. At block 210 the microprocessor controller registers are initialized for counting the steps per second and which establish the percentage of prior art excitation time of the stator coil energization. At block 212 the stepping motor 92 is rotated one step. At block 214 a first counter is loaded with the desired step time and a second counter is loaded with the desired percentage prior art excitation time. At block 216 the second counter is decremented. At block 218 a check is made to see if the second counter is zero. If yes, turn OFF all the motor stator coils at block 220. If no, decrement the first counter at block 222. At block 224 a check is made to see if the first counter is zero. If not, the program returns to block 216. If the first counter is zero at block 224, at block 226 a check is made to see if the stop signal switch 158 shown in FIG. 8 is operated to provide the stop signal 160. If not, the program returns to block 212. If yes, at block 228 all of the stator field coils are turned OFF. In operation, the first counter controls the stepping rate and the second counter controls the percentage of prior art excitation time, such that the stator coils are energized ON which controls the average current and the torque of the motor. To stop the motor the stop pushbutton 158 is operated. After each movement step the program checks to see if the stop button is pushed. If it is the motor coils are turned OFF and the program returns to the data program shown in FIG. 12.

The present motor torque control method and apparatus can be used with a load, such as a transit vehicle door, to control the torque at which the motor rotational step missing operation occurs to provide desired load obstruction detection, with the sensitivity of that detection being dynamically modified as desired. For example, the load motor 92 can be run normally with about 70% prior art excitation time and if a load obstruction is detected, when that load is a passenger door apparatus, the door can reopen and then reclose at about 75% prior art excitation time with a small increase in the motor torque applied to move the door. Each consecutive obstruction of the load can operate to increase the percentage prior art excitation time and the motor torque. If the door is obstructed by inanimate debris in the door track the resulting higher torque levels will likely clear that debris away and no longer obstruct the door.

For a load that is controlled to move to a predetermined desired position and then hold that position, this torque control operation can be used to differentiate between a desired full torque and full current run operation of the motor as compared with a desired lower torque and lower average current holding operation of the motor in relation to that load. When in the run mode of operation the motor needs the full developed torque and when the motor is stopped and in the holding position mode the torque required by the motor to hold the load in that position is lower. The present control apparatus and method enable the motor current to be lowered to a reduced level adequate to hold the load position and provide increased motor efficiency by reducing the required power during the holding operation of the load, such as would be the operation for a stepping motor coupled with a cam controller of a vehicle propulsion control system as described in above-referenced patent application Ser. No. 500,217.

A practical embodiment of the present control apparatus and method was made using the following components.

| | |
|---|---|
| Motor 92 | Superior Electric M112-FJ-327 52.5 in-#, 2.1 volts, 9.2 amps/phase .242 ohms/phase, 2.1 mh/phase Class B insulation |
| Drive Relays 126, 128, 130 and 132 | Douglas Randall Solid State Relay Model K12B, 12 amp 55 vdc, TTL input |
| Micro Controller 100 | Micromint Z8 Controller with Z8671 single chip micro |
| Program Developer & Communication Terminal 148 | TRS-80 Model III running Micromint AXZ8 cross assembler and Omniterm |
| Power Supply 96 | Sorensen DCR40-40B, 0-50 v, 0-40 amp (set at 24 vdc) |

GENERAL DESCRIPTION OF INSTRUCTION PROGRAM LISTING

In the Appendix there are included instruction program listings that have been prepared to control the stepping motor 92 shown in FIG. 8. In Appendix A there is shown the instruction listing corresponding with the data program shown in FIG. 12, and in Appendix B there is shown the instruction listing corresponding with the control program shown in FIG. 13. The instruction listings are written in machine code and basic, both of which can be executed on the Z8 microprocessor computer system. This instruction listing is included to provide an illustration of one suitable embodiment of the present motor control system and method that has actually been prepared. This instruction program listing at the present time is a more or less development program and has not been extensively debugged through the course of practical operation controlling a load such as the doors of a transit vehicle. It is well known by persons skilled in this art that real time process control application programs may contain some bugs or minor errors and it is within the skill of such persons and takes varying periods of actual operation time to identify and routinely correct the more critical of these bugs.

```
5  *    DYN2PWM/Z8B
6  *    WES B/29/83
10      "SPEED 1-255"
20      INPUT S
30      a%091F=S
32      "CUT OFF":INPUT C:a%0922=C
39      a%0944=%8B
40      GOa%0900
45      a%0944=%EB
50      GOTO10
0900
0900
0900
0900    70   FD
0902    E6   02   FF
0905    E6   F6   00
0908    E6   FD   30
090B    E6   24   03
090E    E6   25   E8
0911    E6   26   AF
0914    E6   27   6F
0917    E6   28   5F
091A    E6   29   9F
091D    E6   2C   FF
0920    E6   2D   FE
0923    E6   2E   26
0926    E6   2F   04
0929    E4   24   34
092C    E4   25   35
092F    D6   09   69
0932    09   02
0934    D6   09   83
0937    D6   09   53
093A    D6   09   4C
093D    66   E9   01
0940    EB   04
0942    80   E4
0944    EB   E9
0946    50   FD
0948    E6   02   FF
094B    AF
094C
094C    EC   FF
094E    FC   FD
0950    C2   9E
0952    AF
0953
0953    A8   2C
0955    B8   2D
0957    00   EB
0959    EB   03
095B    E6   02   FF
095E    DC   07
0960    00   ED
0962    EB   FC
0964    00   EA
0966    EB   EF
0968    AF
0969
0969    70   FD
096B    E6   FD   20
096E    00   EE
0970    A6   EE   25
0973    6B   04
0975    F0   21
0977    8B   04

0010  *PROGRAM NAME
0020  *DYN5PWM/SRC WES B/29/83
0030  *FULL STEP PROGRAM
0040  START   PUSH    253
0050          LD      2,#255
0060          LD      246,#0
0070          LD      253,#48
0080          LD      36,#03H
0090          LD      37,#0EBH
0100          LD      38,#175
0110          LD      39,#111
0120          LD      40,#95
0130          LD      41,#159
0140          LD      44,#255
0150          LD      45,#254
0160          LD      46,#38
0170          LD      47,#4
0180          LD      52,36
0190          LD      53,37
0200  CL0     CALL    NEXCL
0210          LD      2,R0
0220          CALL    TABINC
0230          CALL    DELAY
0240          CALL    INPUT
0250          TCM     R9,#1
0260          JR      NZ,CLEX
0270          DECW    RR4
0280          JR      NZ,CL0
0290  CLEX    POP     253
0300          LD      2,#255
0310          RET
0320  ************************
0330  INPUT   LD      R14,#255
0340          LD      R15,#253
0350          LDC     R9,aRR14
0360          RET
0370  ************************
0380  DELAY   LD      R10,44
0390          LD      R11,45
0400  TIME1   DEC     R11
0410          JR      NZ,KEPON
0420          LD      2,#255
0430  KEPON   LD      R13,#7
0440  TIME0   DEC     R13
0450          JR      NZ,TIME0
0460          DEC     R10
0470          JR      NZ,TIME1
0480          RET
0490  ************************
0500  NEXCL   PUSH    253
0510          LD      253,#32
0520          DEC     R14
0530          CP      R14,#37
0540          JR      Z,NO3
0550          SWAP    33
0560          JR      NO4
```

-continued

| | | | | | | | | |
|---|---|---|---|---|---|---|---|---|
| 0979 | EC | 29 | | 0570 | NO3 | LD | R14,#41 | |
| 097B | 8B | 00 | | 0580 | | JR | NO4 | |
| 097D | E5 | 2E | 30 | 0590 | NO4 | LD | 48,846 | |
| 0980 | 50 | FD | | 0600 | | POP | 253 | |
| 0982 | AF | | | 0610 | | RET | | |
| 0983 | | | | 0620 | ************************ | | | |
| 0983 | 00 | 2F | | 0630 | TABIN | DEC | 47 | |
| 0985 | EB | 07 | | 0640 | | JR | NZ,TAB1 | |
| 0987 | E6 | 2F | 04 | 0650 | | LD | 47,#4 | |
| 098A | A0 | 32 | | 0660 | | INCW | 50 | |
| 098C | 8B | 09 | | 0670 | | JR | TAB2 | |
| 098E | E4 | 3F | 3E | 0680 | TAB1 | LD | 62,63 | |
| 0991 | E4 | 3F | 3E | 0690 | | LD | 62,63 | |
| 0994 | E4 | 3F | 3E | 0700 | | LD | 62,63 | |
| 0997 | AF | | | 0710 | TAB2 | RET | | |

SYMBOL TABLE

| | | | | | | | | |
|---|---|---|---|---|---|---|---|---|
| CL0 | 092F | CLEX | 0946 | DELAY | 0953 | INPUT | 094C | KEPON | 095E |
| NEXCL | 0969 | NO3 | 0979 | NO4 | 097D | START | 0900 | TAB1 | 098E |
| TAB2 | 0997 | TABIN | 0983 | TIME0 | 0960 | TIME1 | 0957 | | |

I claim:

1. In combination with a stepper motor door movement control apparatus including a stepper motor having multiple phases, means for coupling said motor to a door, means for sequentially exciting at least two of said phases in a predetermined excitation sequence, whereby at any time during operation of said stepper motor at least two of said phases are excited, the improvement which comprises:

means for simultaneously turning off the excitation to said excited phases for predetermined periods of said excitation sequence such that none of said multiple phases are excited during said off periods, whereby the pull-out torque of said motor may be varied by controlling the time of said off periods.

2. In combination with a stepper door movement control apparatus including a stepper motor having multiple phases, coupling means for connecting said motor to a door, means for sequentially exciting said phases in a predetermined excitation sequence, whereby at any time during operation of said stepper motor only one of said phases is excited, the improvement which comprises:

means for turning off the excitation to said excited phases for predetermined periods of said excitation sequence such that none of said phases are excited during said off periods, whereby the pull-out torque of said motor may be varied by controlling the time of said off periods when said sequentially excited phases are off.

3. In combination with a stepper motor having multiple phases, means for sequentially exciting at least two of said phases in a predetermined excitation sequence, whereby at any time during operation of said stepper motor at least two of said phases are excited, the improvement which comprises:

means for simultaneously turning off the excitation to said excited phases for a predetermined portion of said excitation sequence such that none of said multiple phases are excited, whereby the pull-out torque of said motor may be varied by controlling the time of said off periods during said excitation sequence.

4. In combination with a stepper motor having multiple phases, means for sequentially exciting said phases in a predetermined excitation sequence, whereby at any time during operation of said stepper motor only one of said phases is excited, the improvement which comprises:

means for turning off excitation to said excited phases for predetermined periods of said excitation sequence such that none of said phases are excited, whereby the pull-out torque of said motor may be varied by controlling the time of said off periods in said excitation sequence.

5. The method of controlling the pull-out torque of a stepper motor having multiple phases, said stepper motor coupled with a load, said stepper motor controlled by means for sequentially exciting at least two of said phases in a predetermined excitation sequence, whereby during operation of said stepper motor at least two of said phases are excited, said method comprising:

simultaneously turning off the excitation to said excited phases for predetermined periods of said excitation sequence such that more of said multiple phases are excited during said off periods, whereby the pull-out torque of said motor can be varied by controlling the time of said off periods of said excitation sequence such that none of said phases are excited, whereby the pull-out torque of said motor may be varied by controlling the time of said off periods in said excitation sequence.

6. The method of controlling the pull-out torque of a stepper motor having multiple phases, said stepper motor coupled with a load, said stepper motor controlled by means for sequentially exciting said phases in a predetermined excitation sequence, whereby at any time during operation of said stepper motor only one of said phases is excited, said method comprising, turning off excitation to said excited phases for predetermined periods.

7. A method of controlling the force of closing of a transit vehicle door to clear the door obstructed by debris, said vehicle door coupled to a stepper motor having multiple phases, said stepper motor controlled by means for sequentially exciting at least two said phases in a predetermined excitation sequence, whereby during operation of said stepper motor at least two of said phases are excited, said method comprising:

simultaneously turning off the excitation to said excited phases for successively shorter predetermined periods when an obstruction is sensed to clear said debris away from obstructing the closing of said door.

* * * * *